United States Patent
Chang

(10) Patent No.: US 10,322,459 B1
(45) Date of Patent: Jun. 18, 2019

(54) MECHANISM FOR ADJUSTING A ROTATIONAL POSITION OF A TABLE OF POWER MITER SAW

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 0 days.

(21) Appl. No.: 15/927,356

(22) Filed: Mar. 21, 2018

(51) Int. Cl.
*B23D 45/04* (2006.01)
*B27B 5/36* (2006.01)
*B27B 27/10* (2006.01)

(52) U.S. Cl.
CPC .............. *B23D 45/044* (2013.01); *B27B 5/36* (2013.01); *B27B 27/10* (2013.01); *Y10T 83/7697* (2015.04); *Y10T 83/7705* (2015.04)

(58) Field of Classification Search
CPC ............. Y10T 83/7693; Y10T 83/7697; Y10T 83/7701; Y10T 83/7705; Y10T 83/7722; Y10T 83/7726; Y10T 83/8773; Y10T 83/849; Y10T 83/853; B23D 45/044; B23D 45/042; B23D 45/14; B23D 45/146; B23D 45/024; B23D 45/028; B23D 45/048; B23D 45/046; B27B 5/36; B27B 27/10; B27B 27/08; B27B 27/06; B27B 27/04
See application file for complete search history.

(56) References Cited

U.S. PATENT DOCUMENTS

| | | | | |
|---|---|---|---|---|
| 7,854,187 B2* | 12/2010 | Liu | ...................... | B23D 45/044 83/471.3 |
| 2004/0154448 A1* | 8/2004 | Romo | .................. | B23D 47/025 83/471.3 |
| 2008/0210073 A1* | 9/2008 | Zhang | .................. | B23D 45/044 83/471.3 |
| 2011/0162502 A1* | 7/2011 | Thomas | ................. | B23D 47/00 83/471.3 |
| 2015/0314381 A1* | 11/2015 | Wu | ...................... | B23D 47/025 83/471.3 |

* cited by examiner

*Primary Examiner* — Phong H Nguyen

(57) ABSTRACT

A power miter saw is provided with a base including positioning apertures; a table rotatably mounted on the base and including an arm projecting forward; a saw blade and motor mechanism configured to rotate a circular saw blade thereof; a pivotal positioning seat interconnecting two linear guide mechanisms and a support seat at a rear end of the base; a connecting seat interconnecting the linear guide mechanisms to the saw blade and motor mechanism; a locking device; and a positioning device. Knob rotation and button pressing may adjust a rotational position of the table.

5 Claims, 19 Drawing Sheets

US 10,322,459 B1

MECHANISM FOR ADJUSTING A ROTATIONAL POSITION OF A TABLE OF POWER MITER SAW

BACKGROUND OF THE INVENTION

1. Field of the Invention

The invention relates to power miter saws and more particularly to a mechanism for adjusting a rotational position of a table of a power miter saw.

2. Description of Related Art

U.S. Pat. No. 6,892,618 to the present inventor Chang discloses a circular sawing machine comprising a base; a saw seat movable relative to the base; and a link mechanism pivotally mounted between the base and the saw seat. The saw seat is linearly movable relative to the base. The link mechanism has a symmetrical structure so that the saw seat can be moved linearly relative to the base by linear movement of the link mechanism. The link mechanism includes a positioning seat secured on the base, two symmetrically opposite first links each having a first end mounted on the positioning seat, two symmetrically opposite second links each having a first end pivotally mounted on a second end of a respective one of the two first links, and two symmetrically opposite third links each having a first end pivotally mounted on a second end of a respective one of the two second links and a second end pivotally mounted on a connecting seat which is mounted on the saw seat.

While the device enjoys its success in the market, continuing improvements with respect to a mechanism for adjusting a rotational position of a table of a power miter saw are constantly being sought.

SUMMARY OF THE INVENTION

It is therefore one object of the invention to provide a power miter saw comprising a base including a plurality of positioning apertures; a table rotatably mounted on the base and including an arm projecting forward; a saw blade and motor mechanism configured to rotate a circular saw blade thereof; a pivotal positioning seat interconnecting two linear guide mechanisms and a support seat at a rear end of the base; a connecting seat interconnecting the linear guide mechanisms to the saw blade and motor mechanism; a locking device including a knob disposed on a rear end of the arm, a first face cam disposed under the arm, a first rod interconnecting the knob and the first face cam, a first biasing member disposed on the first face cam, a second face cam disposed under the arm and proximate the first face cam, a locking assembly pivotably disposed under the arm and including a hole, a projection, a second biasing member put on the projection and having one end urging against an inner surface of the arm and the other end urging against a joining portion of the projection and the locking assembly, and a knurled surface, and a second rod having one end secured to the second face cam and the other end fastened in the hole; and a positioning device including a spring biased push button disposed on one side of a rear portion of the arm, a button member disposed on a top of the rear end of the arm, a lever having two side pins pivotably secured to two sides of the arm respectively, and a hole member disposed on one side of a forward portion, two parallel links each pivotably interconnecting the button member and a forward end of the lever, and a resilient, bifurcated positioning member having a forward end rested upon a rear bar of the lever, two rear ends secured to the arm, and a protrusion projecting downward; wherein in a locked state, the first face cam is disengaged from the second face, the second biasing member is compressed, an annular edge of the base is urged against by the knurled surface, the protrusion is disposed in a predetermined one of the positioning apertures, the lever is not capable of pivoting, and the button member is irresponsive to a pressing exerted thereon.

The above and other objects, features and advantages of the invention will become apparent from the following detailed description taken with the accompanying drawings.

DETAILED DESCRIPTION OF THE INVENTION

Figure 1:
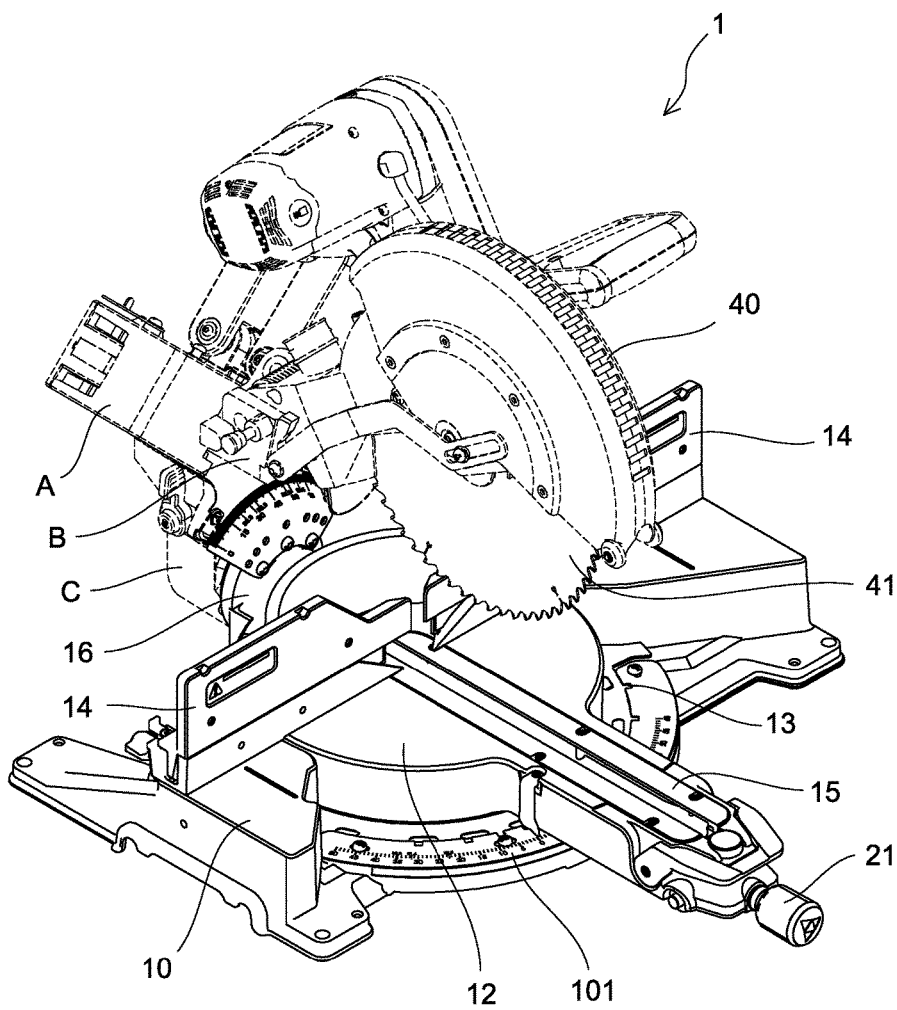
FIG. 1 is a perspective view of a power miter saw incorporating a mechanism for adjusting a rotational position of a table of a base thereof according to the invention.
Figure 2:
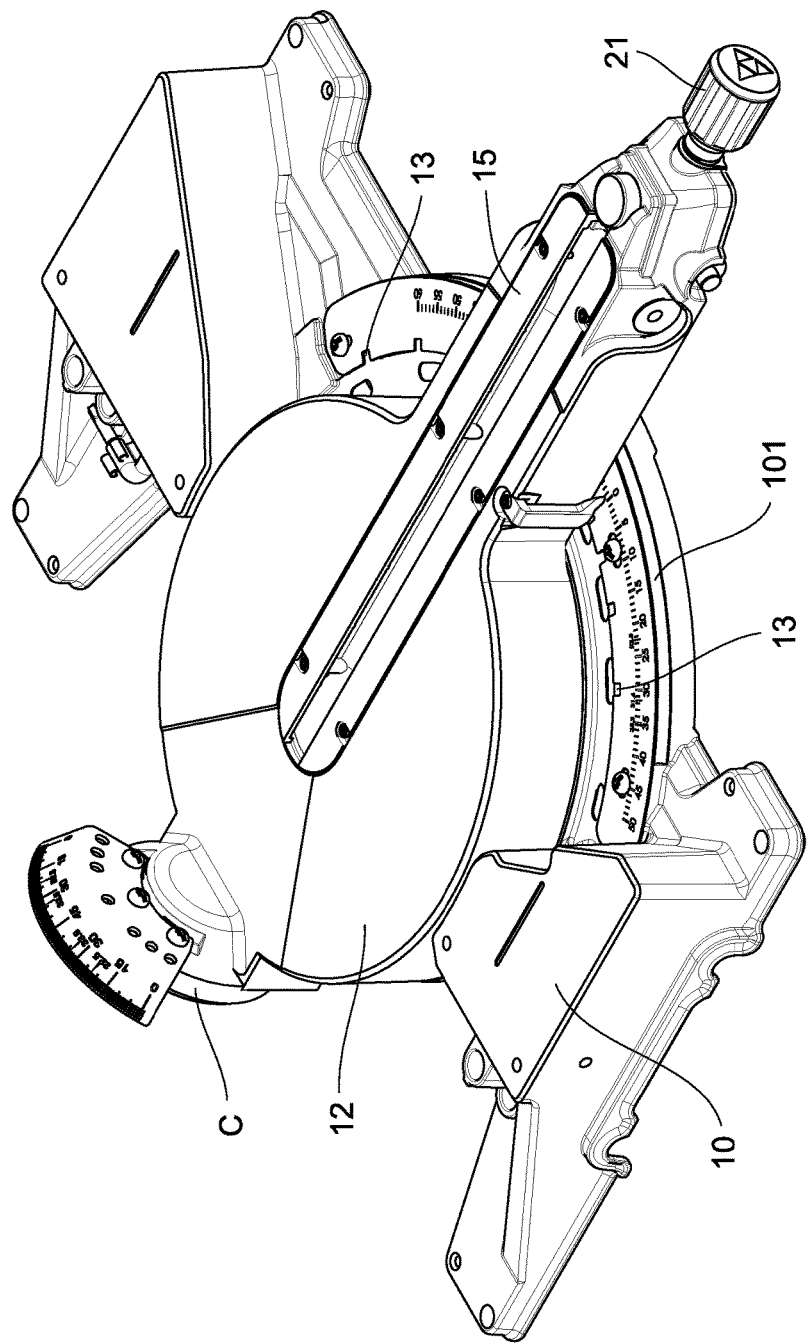
FIG. 2 is a perspective view of the power miter saw with the components shown in broken lines of FIG. 1 removed.
Figure 3:
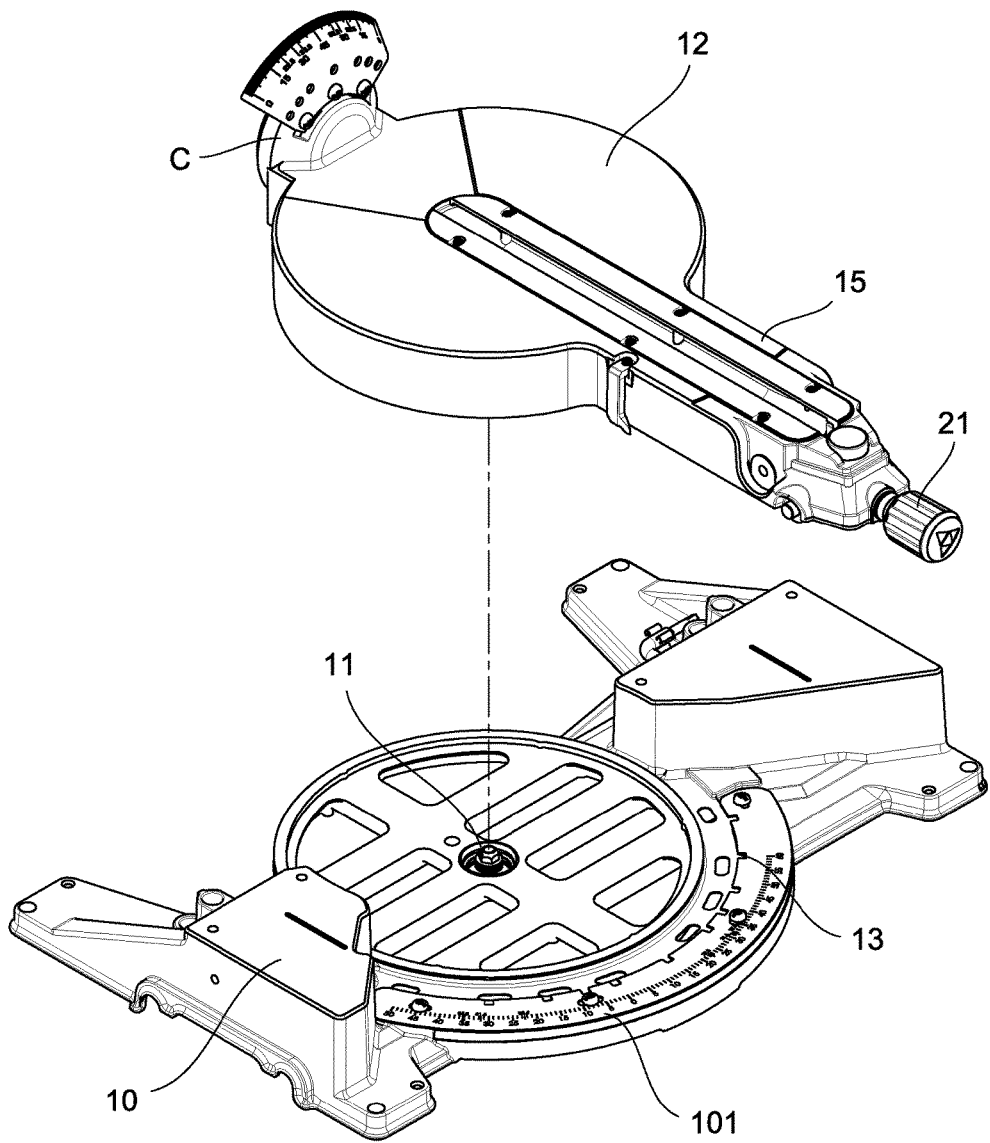
FIG. 3 is an exploded view of FIG. 2.
Figure 4:
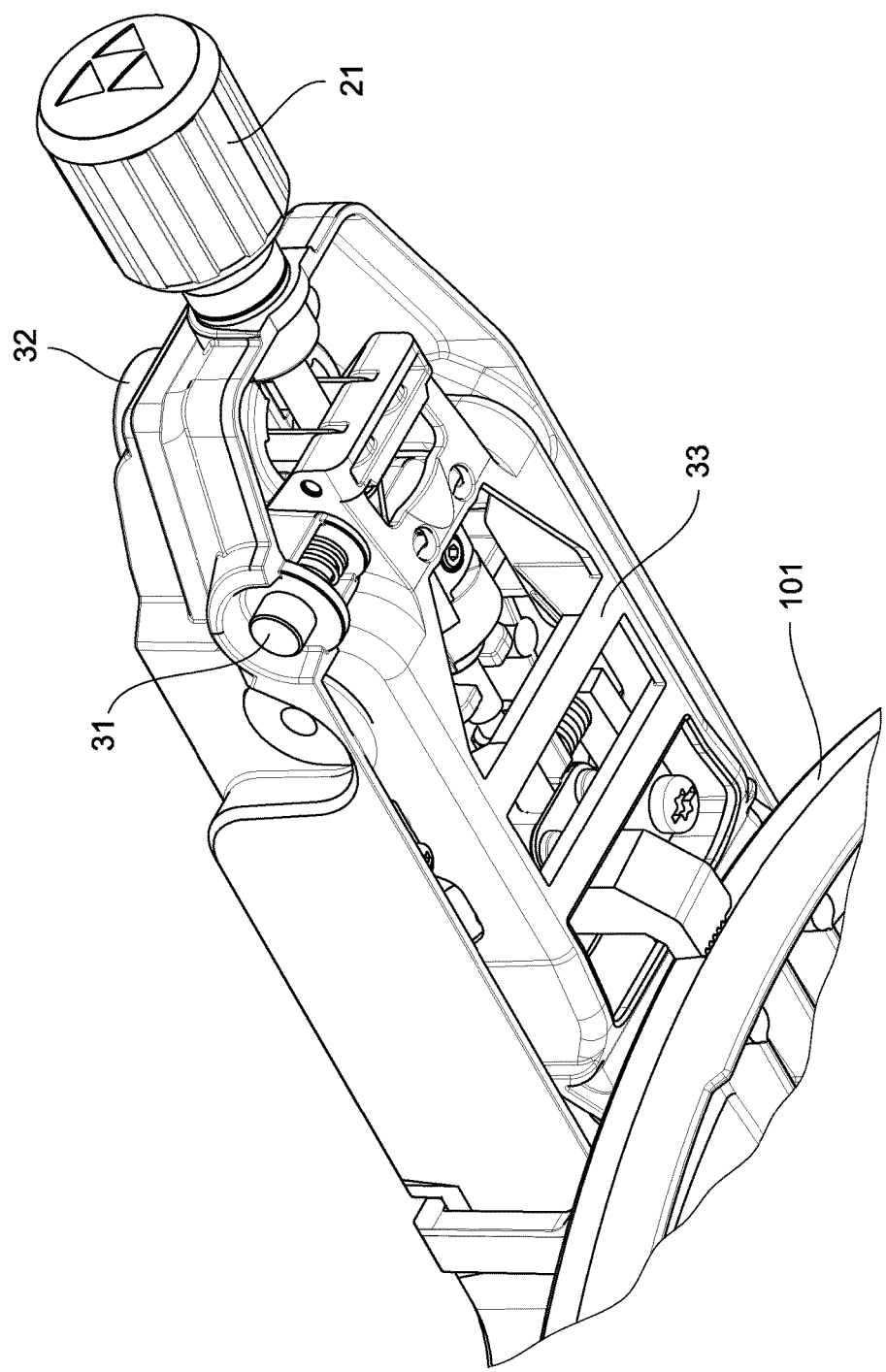
FIG. 4 is a fragmentary view of bottoms of the arm and the lever shown in FIG. 3.
Figure 5:
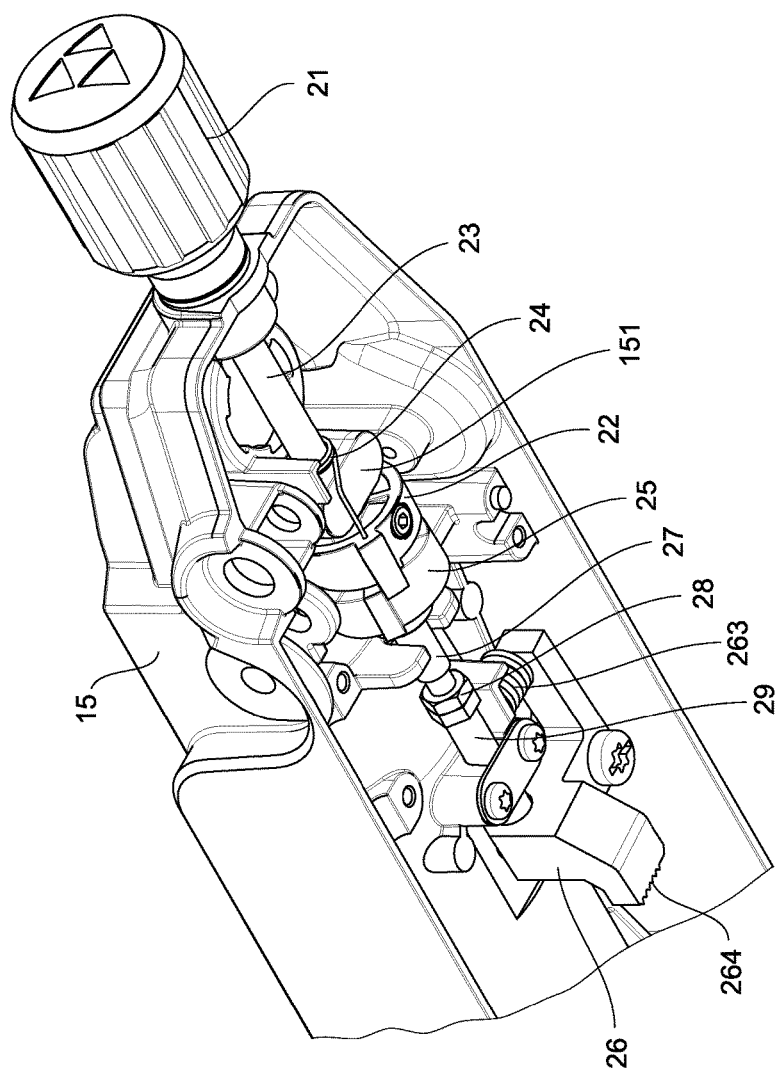
FIG. 5 is a view similar to FIG. 4 with the lever removed to show a locked state of the first and second face cams.
Figure 5A:
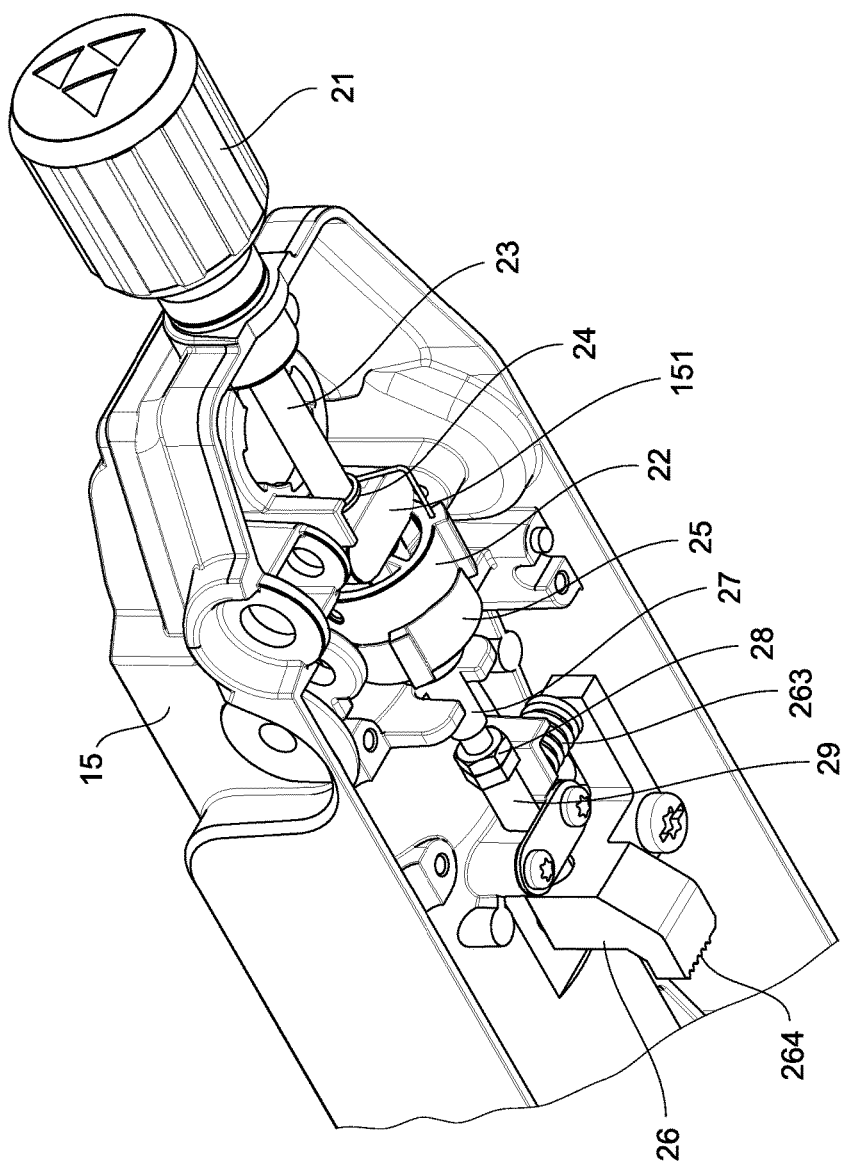
FIG. 5A is a view similar to FIG. 5 showing an unlocked state of the first and second face cams.
Figure 6:
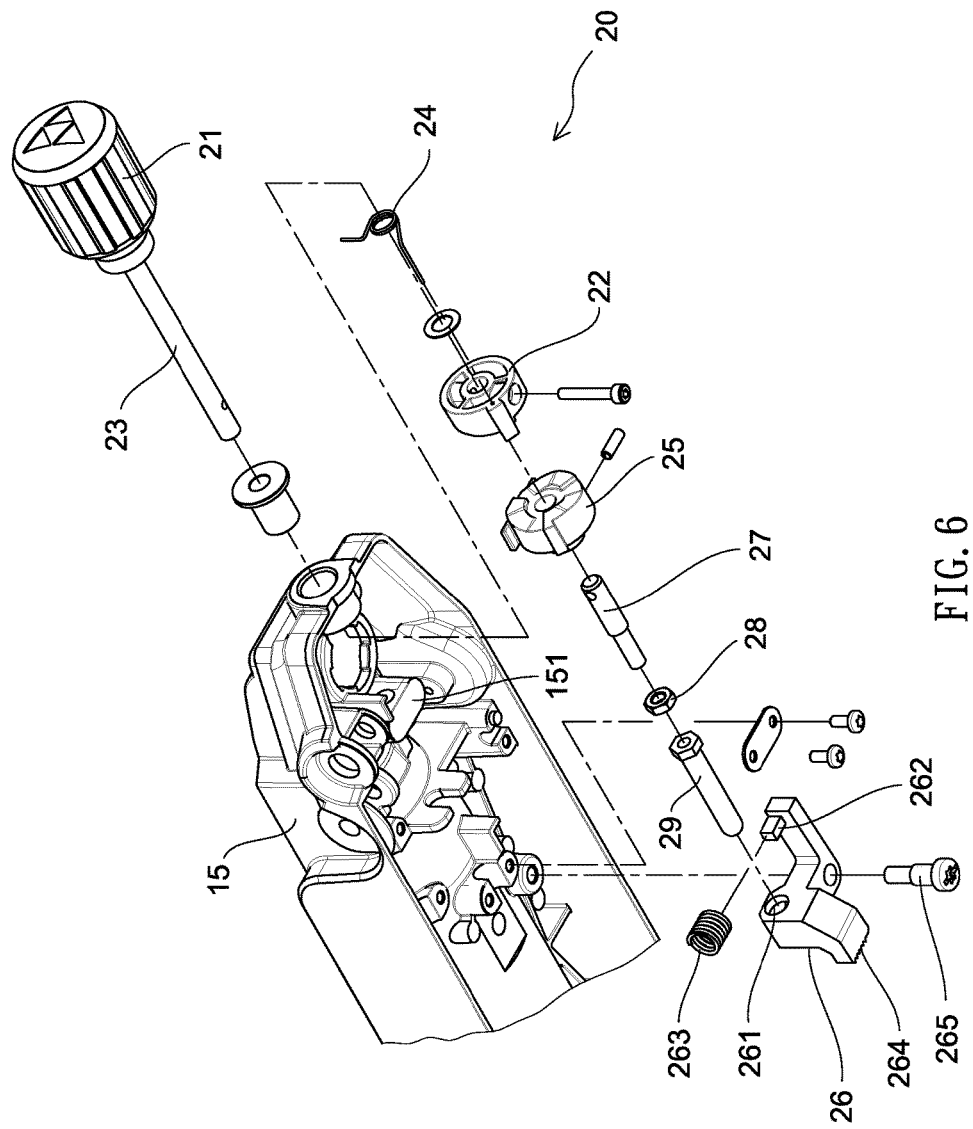
FIG. 6 is an exploded view of the locking device of FIG. 5.
Figure 7:
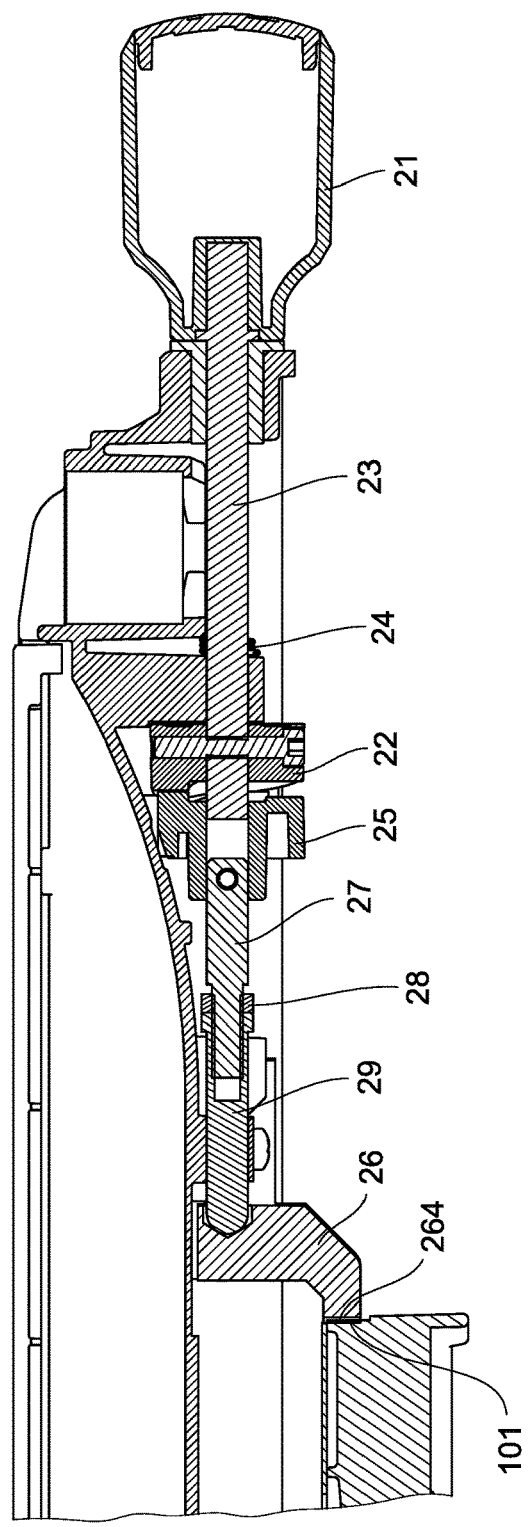
FIG. 7 is a longitudinal sectional view of FIG. 5.
Figure 7A:
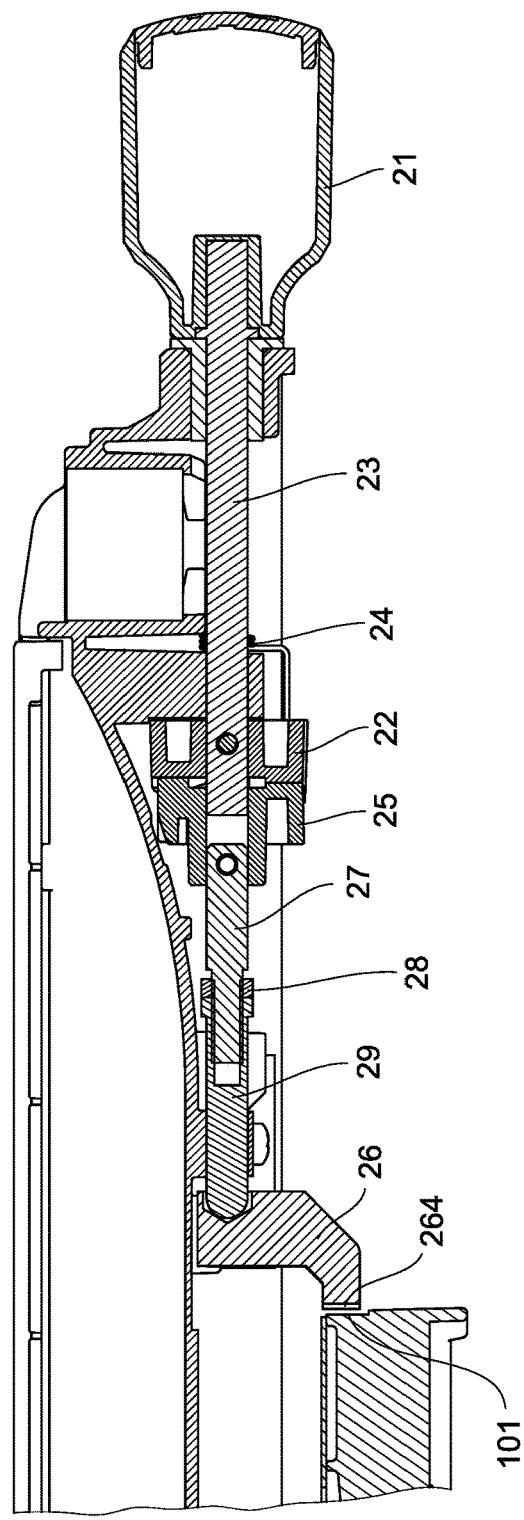
FIG. 7A is a longitudinal sectional view of FIG. 5A.
Figure 8:
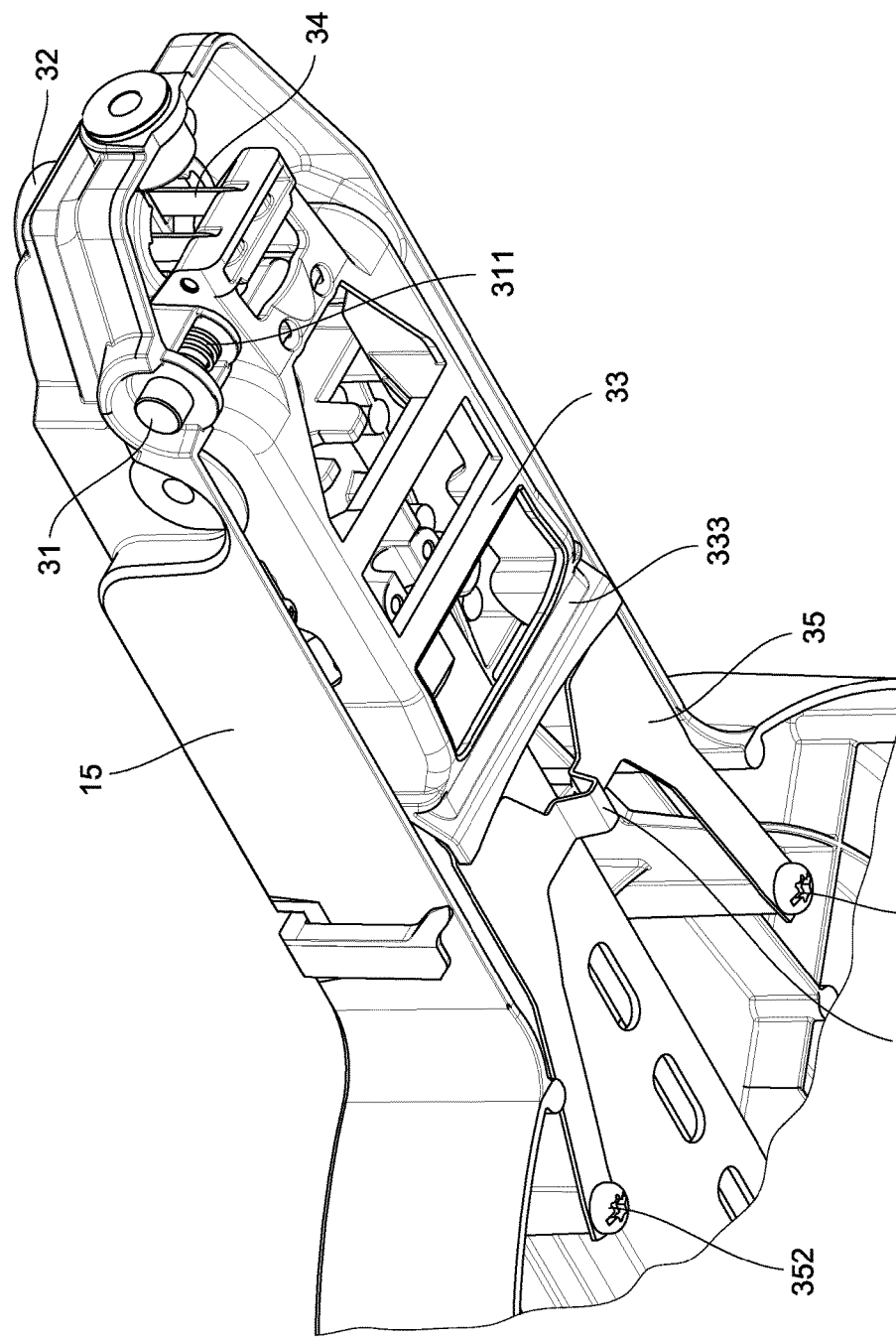
FIG. 8 is a fragmentary view of FIG. 4 where both the push button and the button member are not pressed.
Figure 8A:
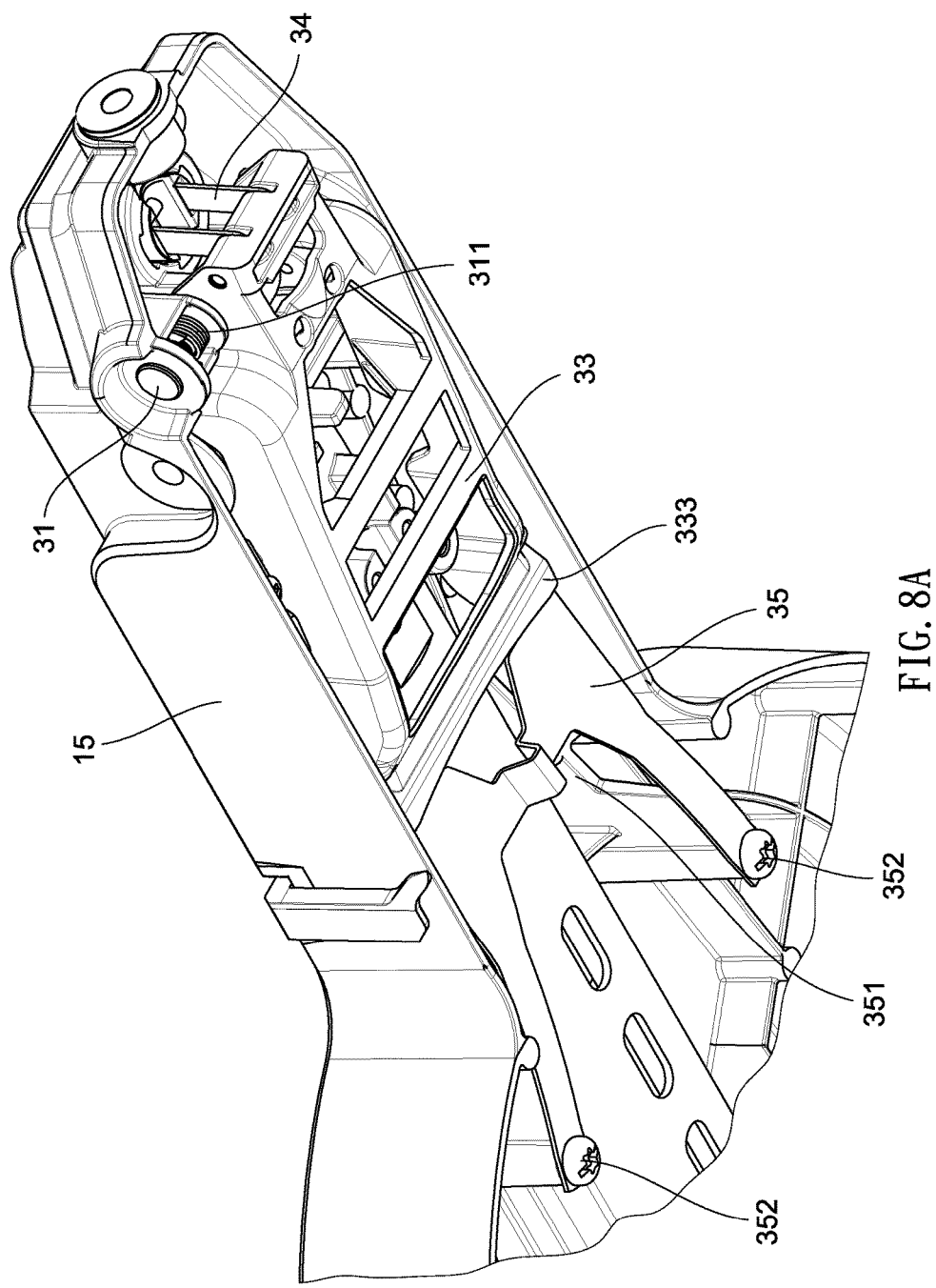
FIG. 8A is a view similar to FIG. 8 where both the push button and the button member are pressed.
Figure 9:
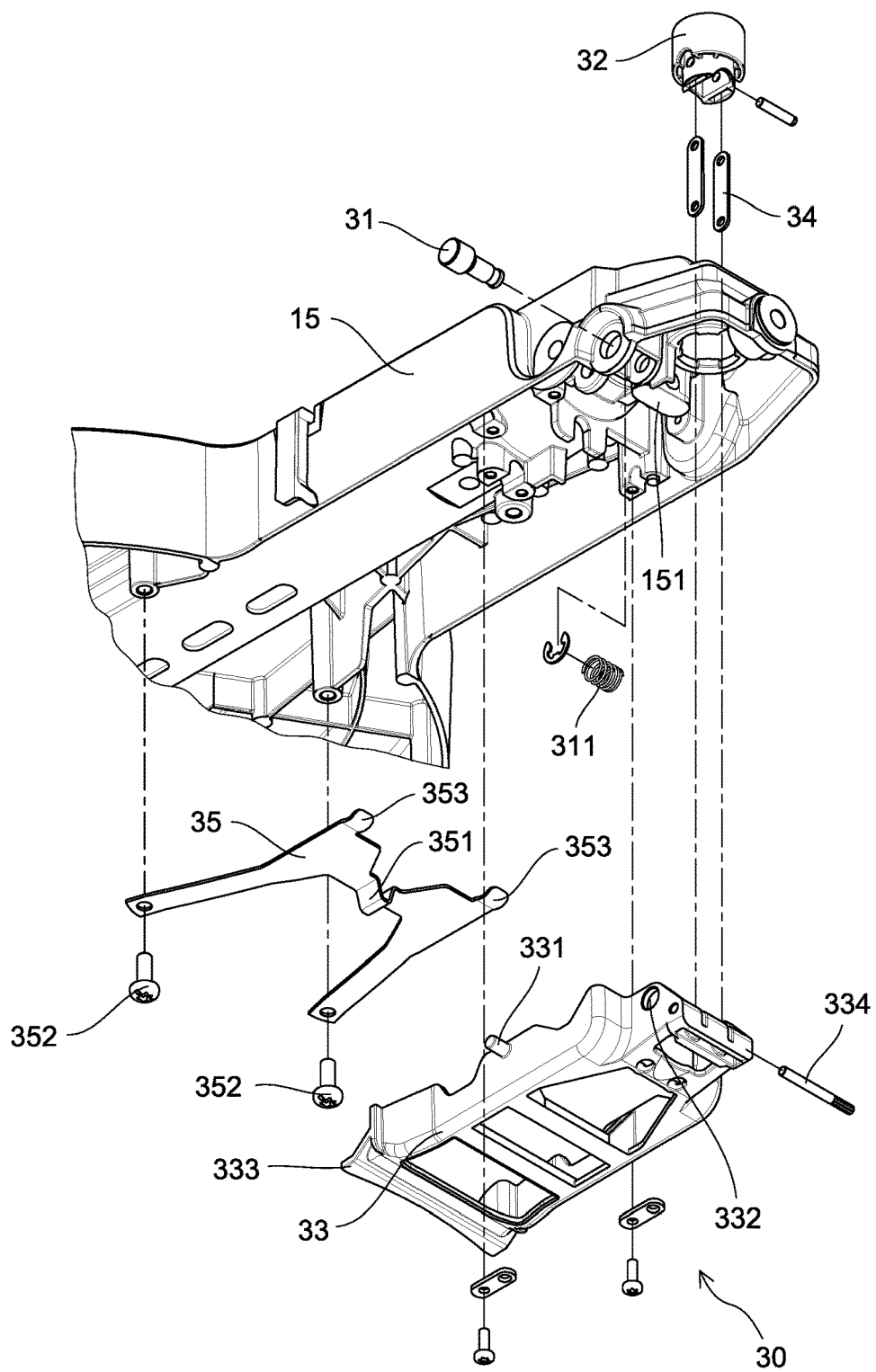
FIG. 9 is an exploded view of the positioning device shown in FIG. 8.
Figure 10:
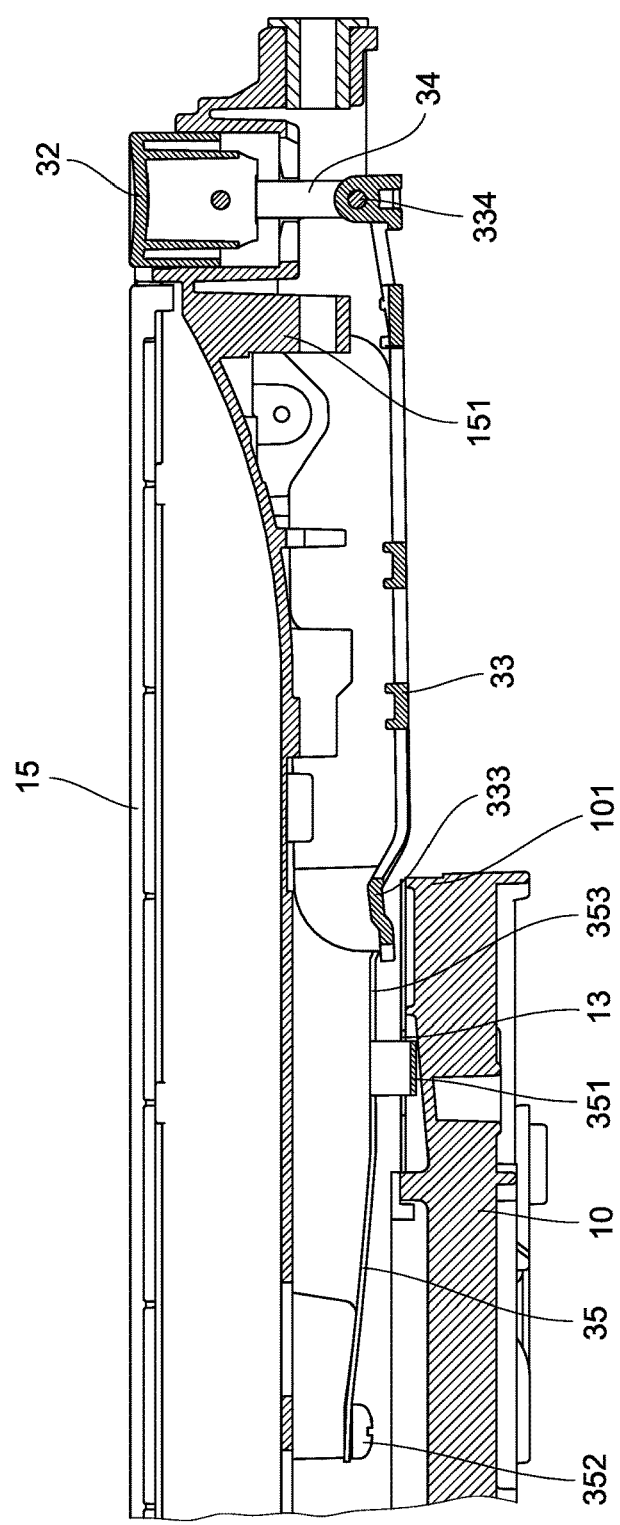
FIG. 10 is a longitudinal sectional view of FIG. 8.
Figure 11:
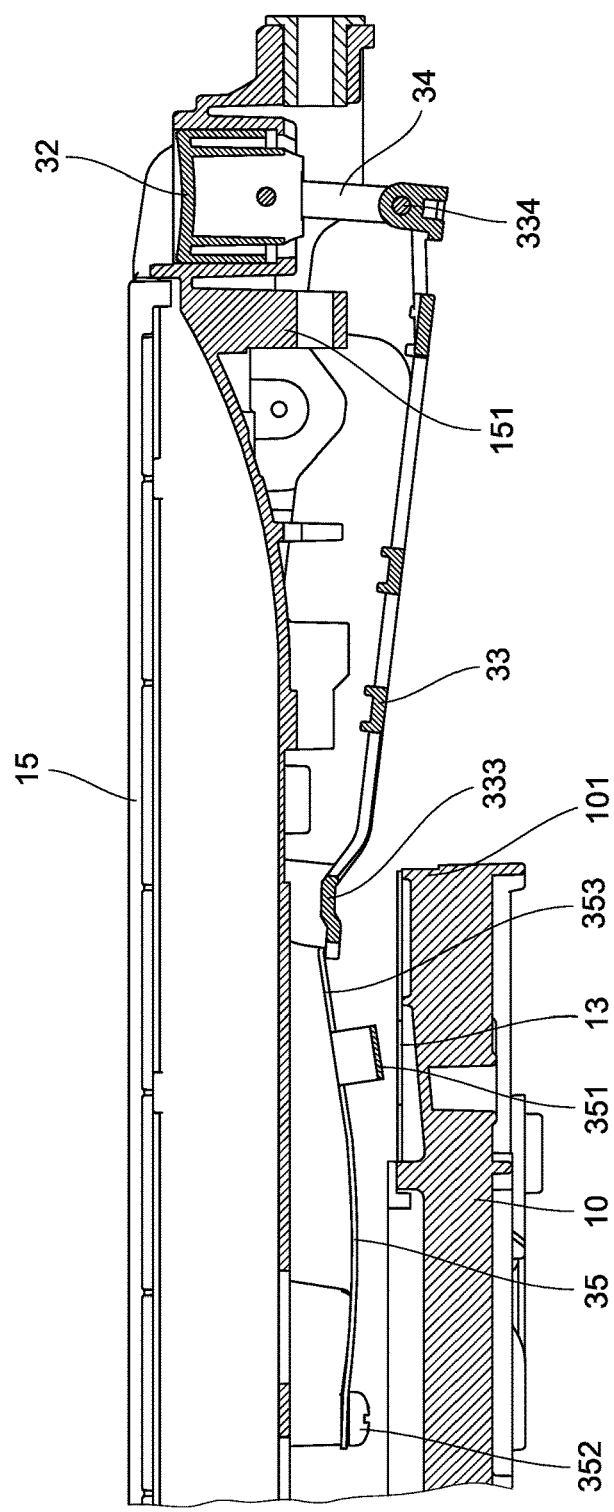
FIG. 11 is a longitudinal sectional view of FIG. 8A.
Figure 12:
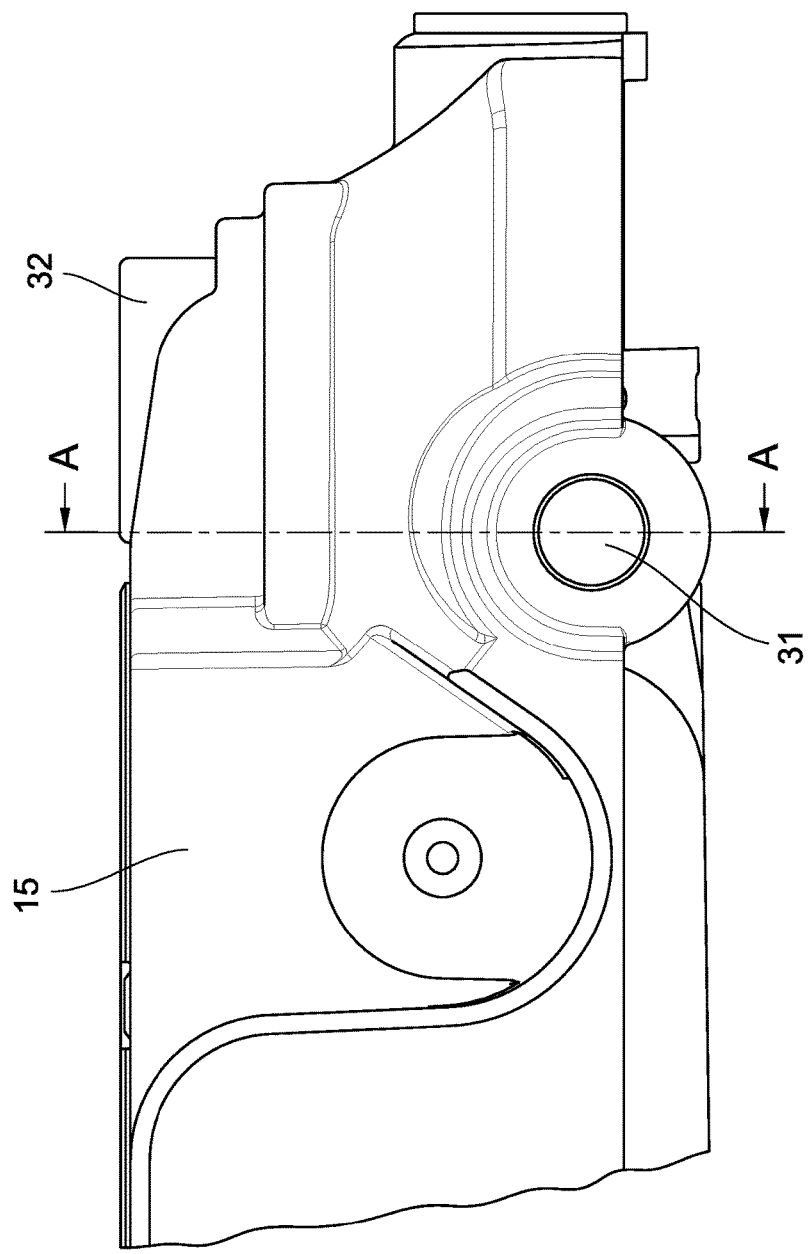
FIG. 12 is a side elevation of a right portion of FIG. 8.
Figure 12A:
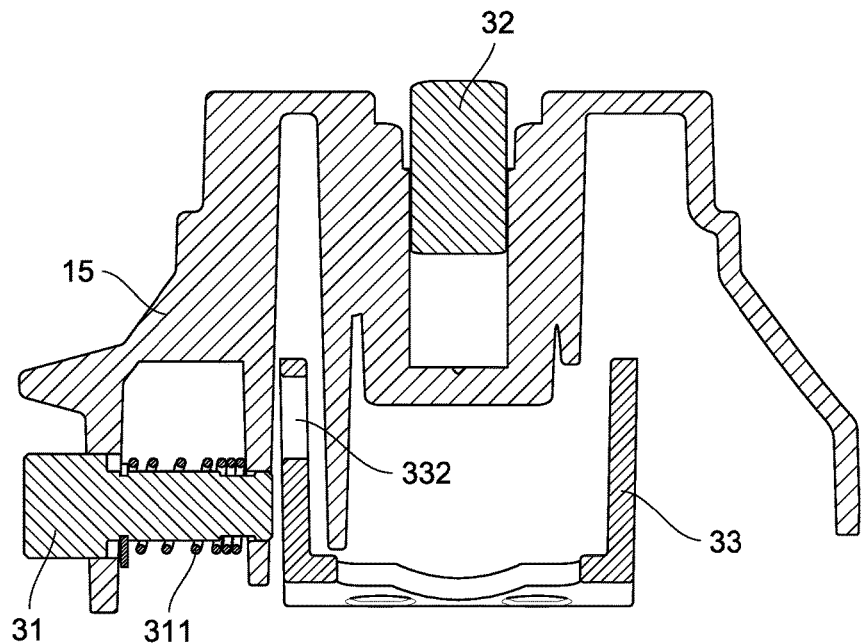
FIG. 12A is a sectional view taken along line A-A of FIG. 12 where both the push button and the button member are not pressed.
Figure 12B:
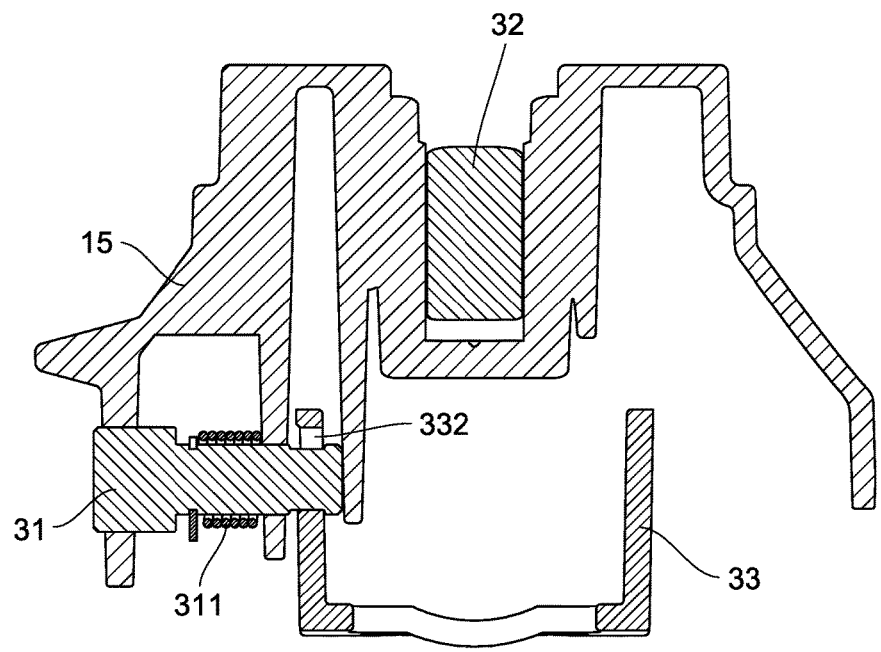
FIG. 12B is a view similar to FIG. 12A where both the push button and the button member are pressed.
Figure 13:
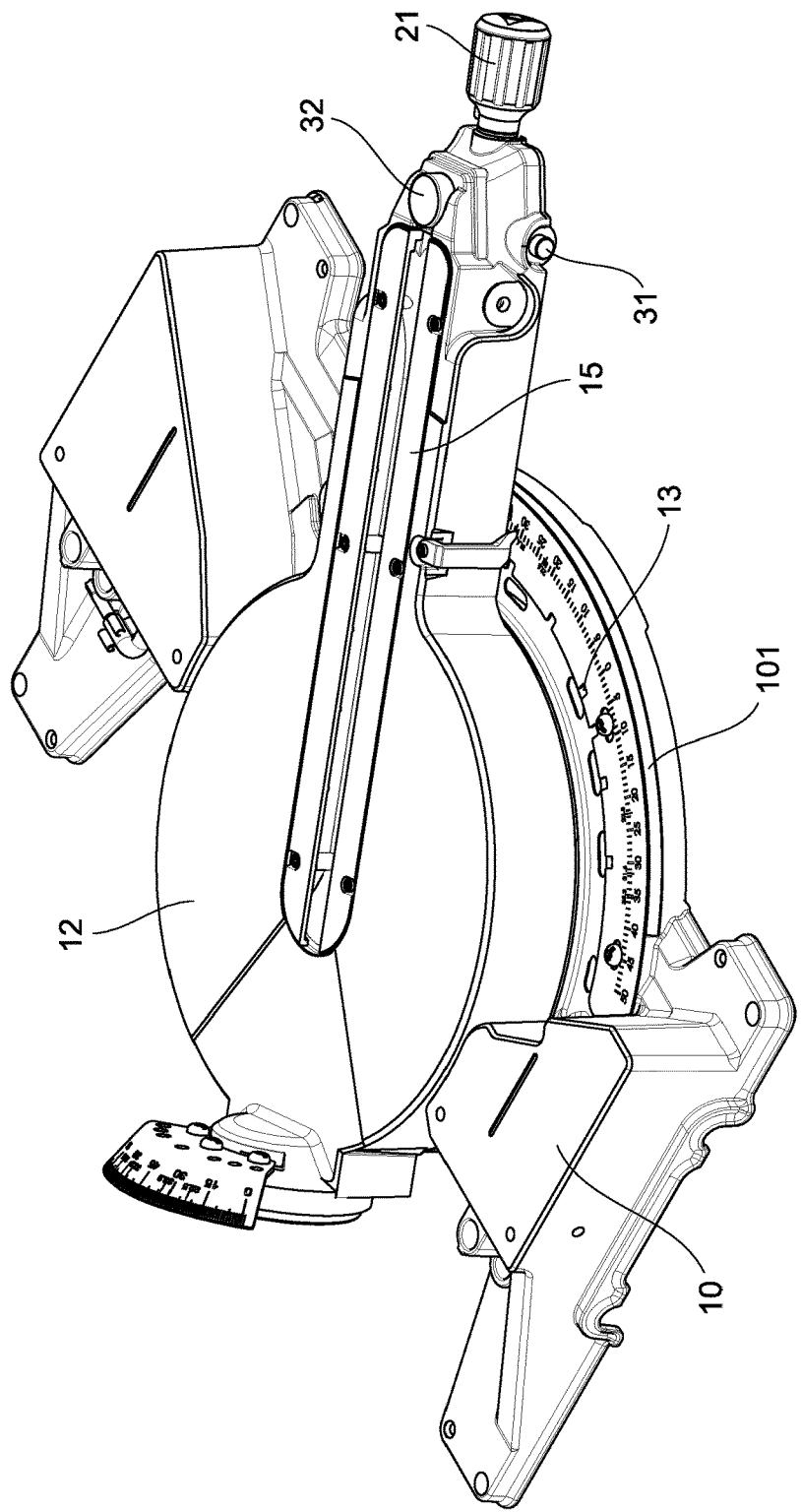
FIG. 13 is a view similar to FIG. 2 showing the table having rotated a predetermined angle relative to the base.
Figure 14:
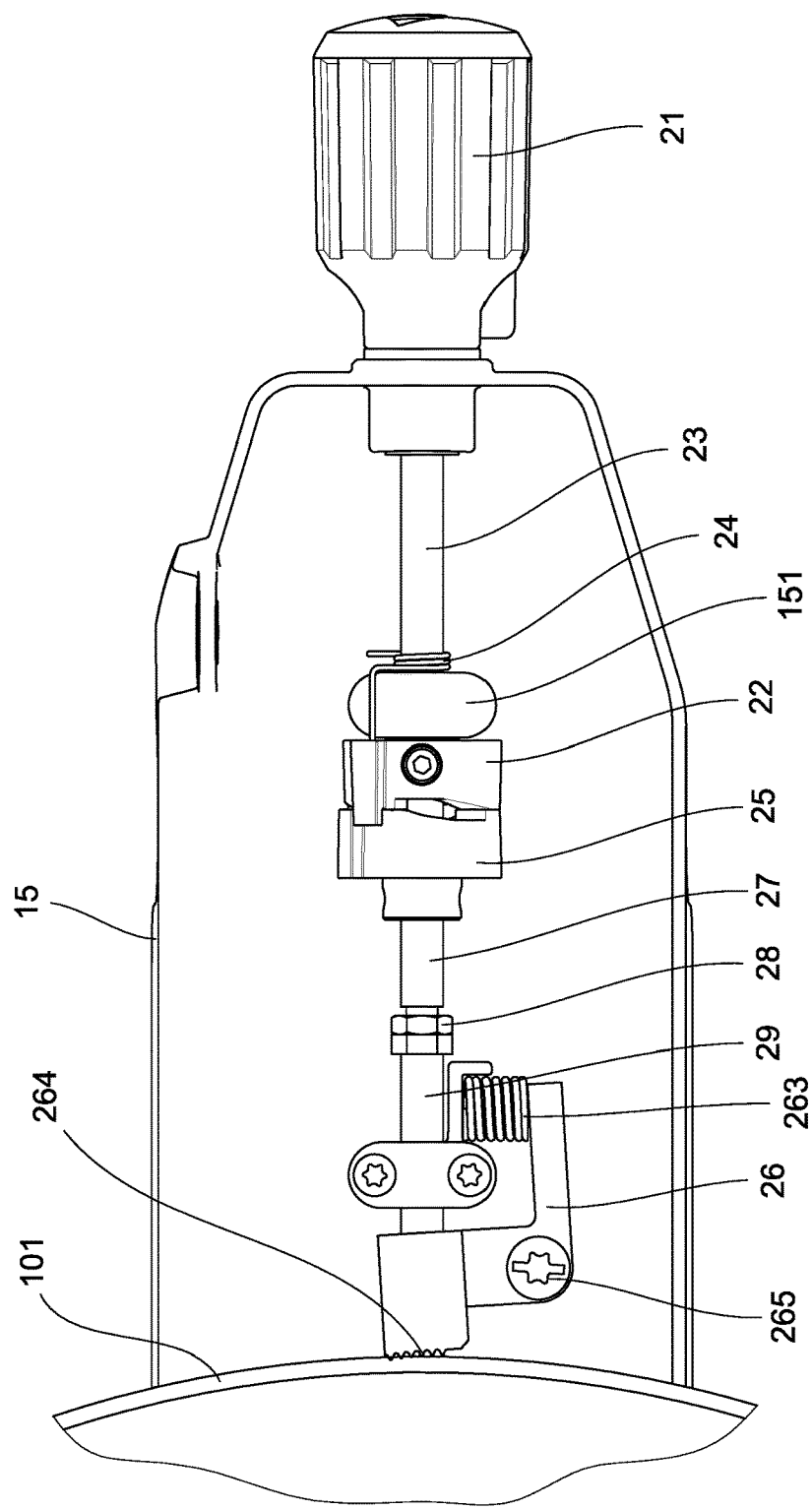
FIG. 14 is a bottom view of FIG. 7 showing the locked state of the first and second face cams.
Figure 14A:
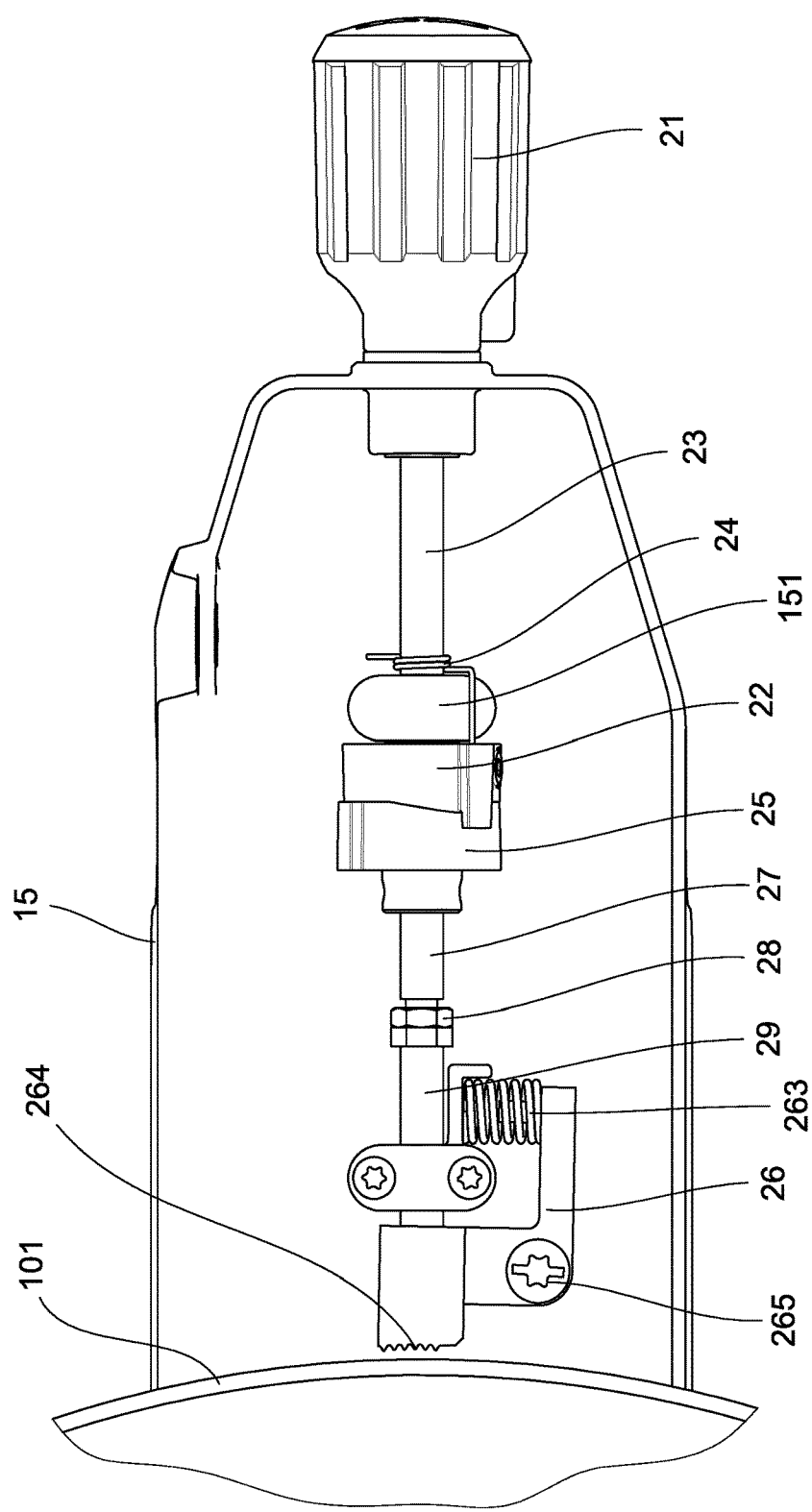
FIG. 14A is a view similar to FIG. 14 showing the unlocked state of the first and second face cams.

Referring to FIGS. 1 to 14A, a power miter saw 1 in accordance with the invention comprises the following components as discussed in detail below.

A graduated base 10 having an axis 11 and a table 12 rotatably mounted on the axis 11 are provided. The table 12 is configured to receive a workpiece (not shown). A plurality of (e.g., 10) equally spaced positioning apertures 13 starting from a marked angle (e.g., 15-degree) are provided on the base 10 and arranged as a curve adjacent to a periphery of the base 10. Two aligned, lateral rip fences 14 each have one end secured to the base 10 and the other end disposed above the table 12. An arm 15 projects forward from the table 12.

A saw blade and motor mechanism 40 is configured to rotate a circular saw blade 41. A pivotal positioning seat C interconnects two linear guide mechanisms A and a rear support seat 16 of the base 10. An upper connecting seat B interconnects the linear guide mechanisms A to the saw blade and motor mechanism 40.

A mechanism for adjusting a rotational position of the table 12 as the subject of the invention is discussed in detail below.

The mechanism comprises a locking device 20 including a knob 21 provided on a rear end of the arm 15 having a holed support 151, a first face cam 22 provided under the arm 15, a first rod 23 interconnecting the knob 21 and the first face cam 22 by pivotably passing through the holed support 151, a first spring 24 provided on the first face cam 22 to render the first face cam 22 a spring-loaded member, a second face cam 25 provided under the arm 15 and proximate the first face cam 22, a locking assembly 26 provided under the arm 15 and including a hole 261, a projection 262, a second spring 263 put on the projection 262, the second spring 263 having one end urging against a component of the arm 15 and the other end urging against a joining portion of the projection 262 and the locking assembly 26, thereby rendering the locking assembly 26 a spring-loaded member, a knurled surface 264, and a pivot 265 for pivotably securing the locking assembly 26 to the underside of the arm 15, a second rod 27 having one end secured to the second face cam 25, a rod-shaped receptacle 29 having one end for receiving a portion of the threaded other end of the second rod 27 and the other end fastened in the hole 261, and a nut 28 threadedly put on the remaining portion of the threaded other end of the second rod 27 so that a total length of the second rod 27 and the receptacle 29 can be adjusted by rotating the nut 28.

The mechanism further comprises a positioning device 30 including a push button 31 provided on one side of a rear portion of the arm 15, a third spring 311 put on a shank of the push button 31 to render the push button 31 a spring-loaded member, a button member 32 provided on a top of the rear end of the arm 15, a lever 33 having two pivot pins 331 on immediate portions of two sides respectively, the pivot pins 331 pivotably secured to two sides of the arm 15 respectively, a hole 332 on one side of a forward portion, and a rear bar 333, two parallel links 34 each having one end connected to the button member 32 and the other end connected to a forward end of the lever 33 by means of a pivot 334, and a resilient, bifurcated positioning member 35 having two forward ends 353 rested upon the rear bar 333 of the lever 33, two rear ends secured to the arm 15 by means of two fasteners 352, and a protrusion 351 projecting downward.

In a default locked state, the first face cam 22 and the second face cam 25 are not engaged each other, the second spring 263 is compressed and an annular edge 101 of the base 10 is urged against by the knurled surface 264, i.e., being temporarily secured, the protrusion 351 is disposed in one of the positioning apertures 13, the lever 33 cannot be activated, and the button member 32 is irresponsive to a pressing exerted thereon.

For quickly adjusting a rotational position of the table 12, a user may use one hand to press down the button member 32 to lower and align the hole 332 with an end of the push button 31 and pivots the rear bar 333 of the lever 33 upward. And in turn, the forward ends 353 of the positioning member 35 lifts to disengage the protrusion 351 from the positioning aperture 13.

Then the user may quickly rotate the table 12 a predetermined angle until a desired position of the table 12 is reached. Thereafter, the user may release the button member 32 to fall the protrusion 351 into a desired one of the positioning apertures 13. Finally, the user may clockwise rotate the knob 21 to disengage the first face cam 22 from the second face cam 25. And in turn, the second face cam 25 moves rearward a small distance to engage the knurled surface 264 with the annular edge 101 of the base 10 and the second spring 263 being compressed, i.e., the base 10 being fastened and the table 12 being locked.

For stepwise adjusting a rotational position of the table 12, a user may use one hand to press down the button member 32 to lower and align the hole 332 with an end of the push button 31 and pivots the rear bar 333 of the lever 33 upward. And in turn, the forward ends 353 of the positioning member 35 lifts to disengage the protrusion 351 from the positioning aperture 13.

Then the user may use the other hand to push the push button 31 to compress the third spring 311 until the push button's 31 stepped-diameter shank passes through the hole 332 with both the push button 31 and the lever 33 being locked.

For adjusting the table 12 to one of a plurality of predetermined angles prior to cutting, a user may rotate the table 12 with the protrusion 351 disposed above the positioning apertures 13 until a desired one of the positioning apertures 13 is reached.

For adjusting the table 12 to any angle prior to cutting, a user may rotate the table 12 to the desired angle. Next, the user releases the push button 31 to unlock the lever 33. Then, the protrusion 351 urges against the desired positioning aperture 13 or a desired marking adjacent to the positioning apertures 13.

Finally, the user may clockwise rotate the knob 21 to disengage the first face cam 22 from the second face cam 25. And in turn, the second face cam 25 moves rearward a small distance to engage the knurled surface 264 with the annular edge 101 of the base 10 and the second spring 263 being compressed, i.e., the base 10 being fastened and the table 12 being locked.

While the invention has been described in terms of preferred embodiments, those skilled in the art will recognize that the invention can be practiced with modifications within the spirit and scope of the appended claims.

What is claimed is:

1. A power miter saw comprising:
   a base including a plurality of positioning apertures;
   a table rotatably mounted on the base and including an arm projecting forward;
   a saw blade and motor mechanism configured to rotate a circular saw blade thereof;
   a pivotal positioning seat interconnecting two linear guide mechanisms and a support seat at a rear end of the base;
   a connecting seat interconnecting the linear guide mechanisms to the saw blade and motor mechanism;
   a locking device including a knob disposed on a rear end of the arm, a first face cam disposed under the arm, a first rod interconnecting the knob and the first face cam, a first biasing member disposed on the first face cam, a second face cam disposed under the arm and proximate the first face cam, a locking assembly pivotably disposed under the arm and including a hole, a projection, a second biasing member put on the projection and having one end urging against an inner surface of the arm and the other end urging against a joining portion of the projection and the locking assembly, and a knurled surface, a second rod having one end secured to the second face cam and the other end fastened in the hole; and a positioning device including a spring biased push button disposed on one side of a rear portion of the arm, a button member disposed on a top of the rear end of the arm, a lever having two side pins pivotably secured to two sides of the arm respectively, and a hole member disposed on one side of a forward portion, two parallel links each pivotably interconnecting the button member and a forward end of the lever, and a resilient, bifurcated positioning member having a forward end rested upon a rear bar of the lever, two rear ends secured to the arm, and a protrusion projecting downward;

wherein in a locked state, the first face cam is disengaged from the second face, the second biasing member is compressed, an annular edge of the base is urged against by the knurled surface, the protrusion is disposed in a predetermined one of the positioning apertures, the lever is not capable of pivoting, and the button member is irresponsive to a pressing exerted thereon.

2. The power miter saw of claim 1, wherein the positioning apertures are arranged as a curve adjacent to a periphery of the base.

3. The power miter saw of claim 1, wherein the second rod has one end secured to the second face cam, and further comprising a rod-shaped receptacle having one end for receiving a portion of the threaded other end of the second rod and the other end fastened in the hole, and a fastener threadedly put on the remaining portion of the threaded other end of the second rod.

4. The power miter saw of claim 1, wherein for adjusting a rotational position of the table in a first mode the following are performed:

pressing down the button member to lower and align the hole with an end of the push button and pivoting the rear bar of the lever upward to lift the forward ends of the positioning member to disengage the protrusion from the positioning aperture;

rotating the table a predetermined angle until a desired position of the table is reached;

releasing the button member to fall the protrusion into one of the positioning apertures; and clockwise rotating the knob to disengage the first face cam from the second face cam and move the second face cam rearward to engage the knurled surface with the annular edge of the base and the second spring being compressed, thereby fastening the base and locking the table.

5. The power miter saw of claim 1, wherein for adjusting a rotational position of the table in a second mode the following are performed:

pressing down the button member to lower and align the hole with an end of the push button and pivoting the rear bar of the lever upward to lift the forward ends of the positioning member to disengage the protrusion from the positioning aperture;

pushing the push button to compress the third spring until the push button's stepped-diameter shank passes through the hole with both the push button and the lever being locked;

rotating the table with the protrusion disposed above the positioning apertures until a desired one of the positioning apertures is reached; and clockwise rotating the knob to disengage the first face cam from the second face cam and move the second face cam moves rearward to engage the knurled surface with the annular edge of the base and the second spring being compressed, thereby fastening the base and locking the table.

* * * * *